Aug. 10, 1937.　　　P. T. CHAMPLIN　　　2,089,537
KNIFE RACK
Filed Oct. 10, 1936
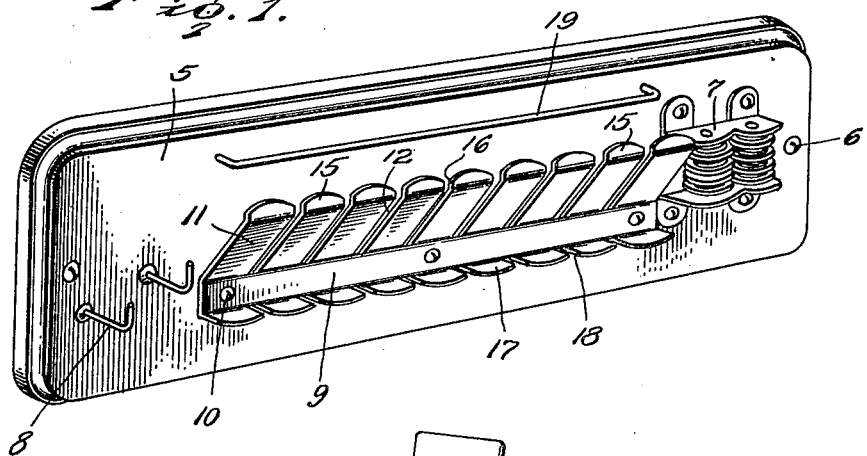
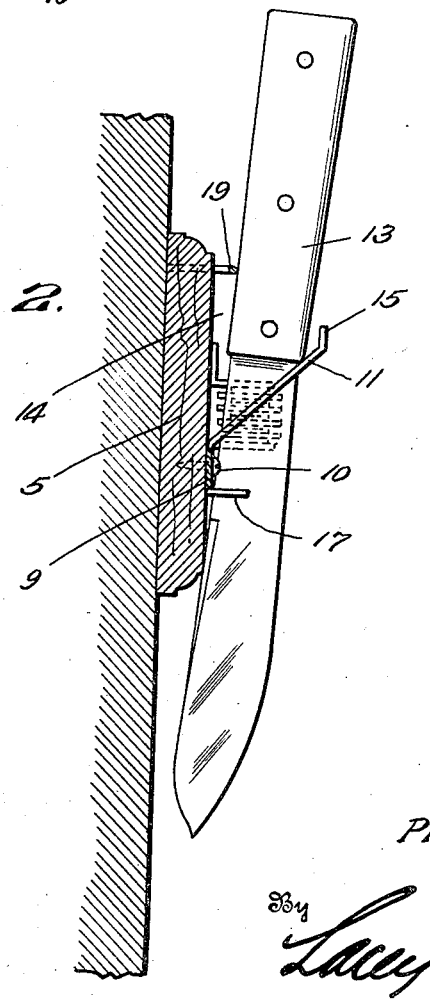
Inventor
Philip T. Champlin.
By Lacey & Lacey,
Attorneys Patented Aug. 10, 1937

2,089,537

UNITED STATES PATENT OFFICE 2,089,537

KNIFE RACK

Philip T. Champlin, Little Valley, N. Y.

Application October 10, 1936, Serial No. 105,133

5 Claims. (Cl. 211—60)

This invention relates to knife racks of that general class shown and described in U. S. Letters Patent issued to me on the 28th day of November, 1933, under Number 1,937,424, the present invention being an improvement thereon.

The object of the invention is generally to improve and simplify the rack by stamping the knife holding element from a single sheet of metal and securing said element to the back board with the upper edge thereof spaced from the board to form a knife receiving trough.

A further object of the invention is to provide a knife rack having upper and lower sets of fingers of different lengths spaced apart to form intermediate slots for the reception of a knife blade, the upper fingers serving to support the handle of the knife and the slots between the lower fingers serving to prevent lateral movement of the knife blade so that the knife will be supported in an upright position.

A further object is to provide the rack with a rod or bar secured to the back board adjacent the knife receiving trough, and against which the handle of the knife is adapted to rest for deflecting the point of the knife blade rearwardly, and thus prevent said point from cutting or otherwise injuring the hand of the user.

Further objects and advantages will appear in the following description.

In the accompanying drawing forming a part of the specification, and in which similar numerals of reference indicate corresponding parts in all the figures of the drawing, Figure 1 is a perspective view of a knife rack embodying the present invention.

Figure 2 is a vertical sectional view.

The improved knife rack, forming the subject matter of the present invention, comprises a back board 5, preferably formed of wood and of any desired shape or marginal outline, said back board being secured to a wall or other support by screws or similar fastening devices 6. Secured to the back board at one end thereof is a conventional type of knife sharpener 7 and fastened to the opposite end of the board are angular hooks 8 from which may be suspended scissors and the like.

The rack proper comprises a holder of unitary construction which is pressed, stamped, or otherwise formed from a single sheet of metal, preferably aluminum, said rack including a flat intermediate portion 9, extending longitudinally of the back board 5, and to which it is secured by suitable fastening devices such as screws 10. The metal at the upper edge of the flat intermediate portion 9 is bent forwardly at an angle thereto to form inclined fingers 11, defining intermediate slots 12 adapted to receive a knife indicated at 13. The fingers 11 are spaced from the back board to form an intermediate substantially V-shaped trough 14 and the ends of the fingers 11 are extended upwardly in a vertical plane to form terminal guard lips 15, the upper surfaces of which are preferably curved or rounded in the direction of the adjacent slots 12 as indicated at 16, so as to assist in guiding the knife blade between said slots when inserting or removing a knife from the rack.

The metal at the lower edge of the intermediate flat portion 9 of the rack is bent laterally to form a plurality of spaced relatively short fingers 17, defining intermediate slots 18, and the ends of said fingers 17 are preferably curved or rounded in the direction of the adjacent slots 18 as shown.

Extending longitudinally of the back board and secured thereto in any suitable manner is a rest preferably in the form of a rod or bar 19, against which the handle of the knife 13 is adapted to bear and thereby deflect the point of the knife rearwardly in the direction of the support or wall, so as to prevent the sharp point of the knife from cutting or otherwise injuring the fingers of the user.

In operation the knife is inserted in any one of the upper slots 12 with the blade of the knife seated in the adjacent lower slot 18 and with the handle of the knife resting against the bar or rod 19. In this position the bar or rod 19 will deflect the point of the knife rearwardly while the slots 18 will prevent lateral tilting of the blade of the knife and thus hold the knife in an upright position as best shown in Figure 2 of the drawing.

It will here be noted that when the knife is in position on the rack, the terminal guard lips 15 serve to prevent the knife from falling out of the slots 12 and 18, it being necessary when removing the knife from the rack to slightly elevate the handle of the knife until it clears the guard lips in order to permit removal of said knife.

It will thus be seen that the bar or rod 19 not only serves to deflect the pointed end of knife rearwardly but also spaces the handle of the knife from the adjacent surface of the back board so that the handle of the knife may be conveniently grasped when removing the knife from the rack. Inasmuch as the blade of the knife seats within the slots 18 of the lower fingers, said knife will always be supported in an upright position and lateral tilting thereof effectually prevented.

The knife racks may be made in different sizes and shapes and constructed to accommodate any desired number of knives without departing from the spirit of the invention.

Having thus described the invention, what is claimed is:

1. A knife rack comprising a support, a holder secured to the support and provided with upper and lower sets of fingers defining intermediate slots for the reception of a knife, the upper set of fingers being disposed at an angle to the support and spaced therefrom to form an intermediate trough, and a rest secured to the support at said trough and against which the handle of the knife is adapted to bear and hold the knife at an angle to the support with the point of said knife deflected rearwardly.

2. A knife rack comprising a support, a holder secured to the support and including an intermediate portion and upper and lower sets of fingers disposed at an angle to each other and spaced apart to form intermediate slots for the reception of a knife, the upper fingers being longer than the lower fingers and having their free ends bent upwardly to form guard lips, and a bar secured to the support adjacent the long fingers and against which the handle of the knife is adapted to rest and support the knife at an angle to the support with the point of the knife extending rearwardly.

3. A knife rack comprising a support, a holder secured to the support and formed of a single sheet of metal having a flat intermediate portion and outwardly inclined upper fingers spaced apart to form intermediate slots and a lower set of fingers of less length than the upper set of fingers and disposed at substantially right angle to the flat intermediate portion of the holder, said lower set of fingers being spaced apart to form slots disposed in alignment with the slots between the upper set of fingers, and a bar secured to the support adjacent the upper set of fingers and against which the handle of the knife is adapted to rest with the blade of the knife seated in the slots between the upper and lower sets of fingers.

4. A knife rack comprising a support, a holder secured to the support and having its upper portion inclined outwardly and spaced from the support to form a trough, said upper inclined portion being provided with slots defining fingers providing terminal guard lips, the lower portion of the holder being bent laterally to form relatively short fingers defining intermediate slots arranged in alignment with the slots in the upper portion of the holder, and a bar secured to the holder at said trough and against which the handle of a knife is adapted to rest whereby to support the blade of the knife in the slots of the upper and lower portions of the holder with the point of the knife extending rearwardly in the direction of said support.

5. A knife rack comprising a holder formed of a single sheet of metal bent to form an intermediate portion adapted to be secured to a support and having its upper portion inclined upwardly and forwardly and provided with spaced slots defining fingers terminating in upstanding guard lips, the metal at the lower portion of the holder being bent at substantially right angle to the intermediate portion and provided with spaced slots defining fingers of less length than the first mentioned fingers.

PHILIP T. CHAMPLIN.